US011339760B2

(12) United States Patent
Sung (10) Patent No.: US 11,339,760 B2
(45) Date of Patent: May 24, 2022

(54) WAVE POWER GENERATION SYSTEM AND METHOD FOR CONTROLLING SAME

(71) Applicant: INGINE, INC., Seoul (KR)

(72) Inventor: Yong Jun Sung, Seoul (KR)

(73) Assignee: INGINE, INC., Seoul (KR)

( * ) Notice: Subject to any disclaimer, the term of this patent is extended or adjusted under 35 U.S.C. 154(b) by 0 days.

(21) Appl. No.: 16/977,096

(22) PCT Filed: Mar. 8, 2019

(86) PCT No.: PCT/KR2019/002729
§ 371 (c)(1),
(2) Date: Sep. 1, 2020

(87) PCT Pub. No.: WO2019/172708
PCT Pub. Date: Sep. 12, 2019

(65) Prior Publication Data
US 2020/0400116 A1    Dec. 24, 2020

(30) Foreign Application Priority Data

Mar. 9, 2018  (KR) ......................... 10-2018-0028033

(51) Int. Cl.
*F03B 13/18*   (2006.01)
*F03B 15/00*   (2006.01)

(52) U.S. Cl.
CPC .......... *F03B 13/1865* (2013.01); *F03B 15/00* (2013.01); *F05B 2240/95* (2013.01); *F05B 2260/406* (2013.01); *F05B 2260/504* (2013.01)

(58) Field of Classification Search
CPC .. F03B 13/1865; F03B 15/00; F03B 13/1855; F03B 11/00; F05B 2240/95;
(Continued)

(56) References Cited

U.S. PATENT DOCUMENTS

2014/0152015 A1* 6/2014 Sidenmark ................ F03G 3/00
290/53

FOREIGN PATENT DOCUMENTS

CL    2008001075    10/2008
CN    105804928    7/2016
(Continued)

OTHER PUBLICATIONS

"International Search Report (Form PCT/ISA/210) of PCT/KR2019/002729," dated Jun. 19, 2019, with English translation thereof, pp. 1-4.

*Primary Examiner* — Tulsidas C Patel
*Assistant Examiner* — Joseph Ortega
(74) *Attorney, Agent, or Firm* — JCIPRNET (57) ABSTRACT

Disclosed are a wave power generation system for generating power by means of a hydraulic circuit, and a method for controlling same. The wave power generation system comprises: a tension transmission member for transmitting motion energy which is generated by means of six-degrees-of-freedom motion of a movable object floating on the waves; a power conversion unit comprising a fluid pressure generation unit which is connected to the tension transmission member and is for generating a fluid pressure; and an equalizer connected to the tension transmission member and for maintaining the tension of the tension transmission member. In the power conversion unit, if tension is applied from the tension transmission member, the fluid pressure generation unit enables a fluid to flow in a first direction by means of the tension and, if tension is not applied from the tension transmission member, the fluid pressure generation unit enables a fluid to flow in a second direction by means of the equalizer.

12 Claims, 3 Drawing Sheets

(58) Field of Classification Search
CPC .......... F05B 2260/406; F05B 2260/504; F05B 2240/917; Y02E 10/20; Y02E 10/30
See application file for complete search history.

(56) References Cited

FOREIGN PATENT DOCUMENTS

| | | | |
|---|---|---|---|
| EP | 2128430 | 12/2009 | |
| JP | 2006189018 | 7/2006 | |
| JP | 5260092 | 8/2013 | |
| KR | 101049518 | 7/2011 | |
| KR | 20120013472 | 2/2012 | |
| KR | 20120115000 | 10/2012 | |
| KR | 20130074001 | 7/2013 | |
| KR | 20150120896 | 10/2015 | |
| KR | 20170084891 | 7/2017 | |
| WO | 2009098514 | 8/2009 | |
| WO | WO-2016111461 A1 * | 7/2016 | ............. B63B 22/18 |
| WO | 2017122839 | 7/2017 | |

* cited by examiner

WAVE POWER GENERATION SYSTEM AND METHOD FOR CONTROLLING SAME

TECHNICAL FIELD

The following description relates to a wave power generation system and a method of controlling the wave power generation system.

BACKGROUND ART

Generally, power generation methods of generating electricity include, for example, hydroelectric power generation, thermal power generation, nuclear power generation, and the like, and such power generation methods require large-scale power generation facilities. In addition, in the case of thermal power generation, since a huge amount of petroleum or coal energy needs to be supplied in order to operate power generation facilities, many difficulties are predicted at the present time when petroleum and coal resources are depleted, and pollution also becomes a big issue. Also, in the case of nuclear power generation, a radiation leakage and nuclear waste disposal are serious. Since a fall head of water is used in the hydroelectric power generation, a large-scale dam needs to be constructed, which leads to a change in surrounding environments. Also, the hydroelectric power generation has environmental constraints that a river with abundant water resources needs to be assumed for a dam construction. Thus, there is a demand for groundbreaking power generation methods that are cheaper, safer, and more environmentally friendly than the above general power generation methods, and one of them is wave power generation capable of generating power using movement of waves.

Attention has been focused on tidal power generation for generating power using a tidal range, tidal stream power generation for generating power using a high flow rate of seawater, and wave power generation for generating power using movement of waves. In particular, the wave power generation is a technology of generating power based on constant movement of waves, and may continue to produce energy. The wave power generation converts a back-and-forth motion of water particles and a periodic vertical motion of the sea level due to waves into a mechanical rotational motion or an axial motion through an energy conversion device, and then into power. Wave power generation methods may be classified into a variety of kinds according to a primary energy conversion method based on a wave height, and a representative method is a movable object type method of operating an electric generator in response to a vertical motion or a rotational motion of a buoy floating on a water surface by movement of waves.

The movable object type method is a method of receiving movement of an object, for example, a buoy, that moves based on movement of waves, converting the movement into a reciprocating or rotational motion, and generating electric power using an electric generator, and an example thereof is disclosed in Korean Patent Application Publication No. 10-2015-00120896 or Japanese Patent Registration No. 5260092.

However, irregular kinetic energy is provided due to characteristics of waves. Therefore, to stably produce energy, there is a demand for a system and a control method for generating effective power in a motion transmission portion that transmits wave energy, and an equalizer that converts received kinetic energy into rotational kinetic energy used for power generation.

The above description has been possessed or acquired by the inventor(s) in the course of conceiving the present invention and is not necessarily an art publicly known before the present application is filed.

DISCLOSURE OF INVENTION

Technical Goals

Example embodiments provide a control system and method of a wave power generation facility that may enhance an energy conversion efficiency and that may have a high degree of control freedom.

Problems to be solved in the example embodiments are not limited to the aforementioned problems, and other problems not mentioned herein can be clearly understood by those skilled in the art from the following description.

Technical Solutions

According to example embodiments to solve the foregoing problems, a wave power generation system is configured to include a tension transmission member configured to transmit kinetic energy generated by a six-degrees-of-freedom motion of a movable object floating on waves, a power conversion unit including a fluid pressure generation unit that is connected to the tension transmission member and that is configured to generate a fluid pressure, and an equalizer connected to the tension transmission member and configured to maintain a tension of the tension transmission member. When the tension is applied by the tension transmission member, the fluid pressure generation unit in the power conversion unit may allow a fluid to flow in a first direction by the tension. When the tension is not applied by the tension transmission member, the fluid pressure generation unit may allow a fluid to flow in a second direction by the equalizer.

According to an aspect, the power conversion unit may include the fluid pressure generation unit, a hydraulic driving unit connected to a power generation unit to generate power, a first hydraulic circuit configured to allow a fluid to flow toward the fluid pressure generation unit, a second hydraulic circuit configured to allow a fluid to flow toward the hydraulic driving unit, and a rectifier circuit disposed between the first hydraulic circuit and the second hydraulic circuit and configured to change a direction of the fluid. When a fluid flows in a second direction opposite to a first direction in which the fluid flows in the first hydraulic circuit, the rectifier circuit may change a flow direction of the fluid and may allow the fluid to flow in the same direction in the second hydraulic circuit. For example, the rectifier circuit may include a plurality of branch flow paths arranged in a form of a bridge, and check valves may be disposed on the plurality of branch flow paths, respectively. Also, check valves on branch flow paths facing each other in the rectifier circuit may be disposed in the same direction, and check valves on neighboring branch flow paths may be disposed in different directions.

According to an aspect, each of the fluid pressure generation unit and the hydraulic driving unit may be a hydraulic motor.

According to an aspect, the second hydraulic circuit may include a high-pressure accumulator and a low-pressure accumulator provided in front of and behind the hydraulic driving unit. The second hydraulic circuit may include a plurality of check valves, and the check valves may be provided in front of and behind the hydraulic driving unit.

According to an aspect, the equalizer may include one of a hydraulic motor, a hydraulic pump, a hydraulic cylinder, an electric motor, a gas spring, and a mechanical spring.

According to an aspect, a plurality of tension transmission members connected to at least three portions of the movable object may be provided.

According to an aspect, a converting body coupled to the plurality of tension transmission members may be provided. The power conversion unit may be provided on one side of the converting body, and the equalizer may be provided on another side of the converting body. An equalizer may be provided in each of the plurality of tension transmission members, or the plurality of tension transmission members may be connected to one equalizer.

According to an aspect, an accelerator configured to increase a rotational speed of the converting body may be included. The accelerator may be disposed between the converting body and the power conversion unit. Here, the accelerator may be formed at a gear ratio lower than a preset criterion.

According to example embodiments to solve the foregoing problems, a wave power generation system is configured to include a movable object that moves by waves while floating on the waves, a motion transmission unit including a plurality of tension transmission members that are connected to at least three portions of the movable object to enable a six degrees-of-freedom motion of the movable object and that are configured to transmit kinetic energy of the movable object in one direction, a converting body connected to the plurality of tension transmission members, an equalizer disposed on one side of the converting body, a power conversion unit disposed on another side of the converting body and configured to generate a fluid pressure, and a power generation unit connected to the power conversion unit and configured to generate power. When the tension transmission members are pulled, energy is stored in the equalizer, and the power conversion unit allows a fluid to flow in a first direction so that power is generated in the power generation unit. When the tension transmission members are not pulled, the power conversion unit allows a fluid to flow in a second direction by the energy stored in the equalizer so that power is alternately generated by bidirectional motions of the tension transmission members in the power generation unit.

According to an aspect, the power conversion unit may include a fluid pressure generation unit connected to the tension transmission members and configured to generate a fluid pressure, a hydraulic driving unit connected to the power generation unit, a first hydraulic circuit configured to allow a fluid to flow toward the fluid pressure generation unit, a second hydraulic circuit configured to allow a fluid to flow toward the hydraulic driving unit, and a rectifier circuit disposed between the first hydraulic circuit and the second hydraulic circuit and configured to change a direction of the fluid. When a fluid flows in a second direction opposite to a first direction in which the fluid flows in the first hydraulic circuit, the rectifier circuit may change a flow direction of the fluid and may allow the fluid to flow in the same direction in the second hydraulic circuit.

According to an aspect, the second hydraulic circuit may include a high-pressure accumulator and a low-pressure accumulator provided in front of and behind the hydraulic driving unit.

According to an aspect, the equalizer may include one of a hydraulic motor, a hydraulic pump, a hydraulic cylinder, an electric motor, a gas spring, and a mechanical spring.

According to example embodiments to solve the foregoing problems, a method of controlling a wave power generation system includes allowing, by a power conversion unit, a fluid to flow in a first direction when a tension is applied through a tension transmission member by a six degrees-of-freedom motion of a movable object floating on waves, allowing, by a rectifier circuit of the power conversion unit, the fluid flowing in the first direction to flow toward a hydraulic driving unit, allowing, by the power conversion unit, a fluid to flow in a second direction by an equalizer when the tension is not applied by the tension transmission member, changing, by the rectifier circuit, a direction of the fluid flowing in the second direction and allowing the fluid to flow toward the hydraulic driving unit, and generating, by a power generation unit connected to the hydraulic driving unit, power alternately through a bidirectional motion of the tension transmission member.

Effects

As described above, according to example embodiments, it is possible to generate power by converting energy transmitted by a power transmission unit into a fluid pressure using a fluid pressure generation unit, and possible to reduce a size of the power transmission unit.

Also, energy may be absorbed in a pressure accumulator and a power generation unit may be operated using the absorbed energy, and thus it is possible to maintain a constant quality of electricity generated in the power generation unit due to a smoothing effect.

Also, the rectifier circuit may function as a one-way clutch.

The effects of the wave power generation system and a method of controlling the wave power generation system are not limited to the aforementioned effects, and other unmentioned effects can be clearly understood by those skilled in the art from the following description.

BRIEF DESCRIPTION OF DRAWINGS

The accompanying drawings illustrate example embodiments of the present invention and, together with the detailed description of the invention, serve to provide further understanding of the technical idea of the present invention. However, the present invention is not to be construed as being limited to the drawings.

BEST MODE FOR CARRYING OUT THE INVENTION

Hereinafter, example embodiments will be described in detail with reference to the illustrative drawings. In denoting reference numerals to constituent elements of the respective drawings, it should be noted that the same constituent elements will be designated by the same reference numerals, if possible, even though the constituent elements are illustrated in different drawings. Further, in the following description of the example embodiments, a detailed description of publicly known configurations or functions incorporated herein will be omitted when it is determined that the detailed description obscures the subject matters of the example embodiments.

In addition, the terms first, second, A, B, (a), and (b) may be used to describe components of the example embodiments. These terms are used only for the purpose of discriminating one component from another component, and the nature, the sequences, or the orders of the components are not limited by the terms. When one component is described as being "connected", "coupled", or "joined" to another component, it should be understood that one component can be connected or attached directly to another component, and an intervening component can also be "connected", "coupled", or "joined" to the components.

Figure 1:
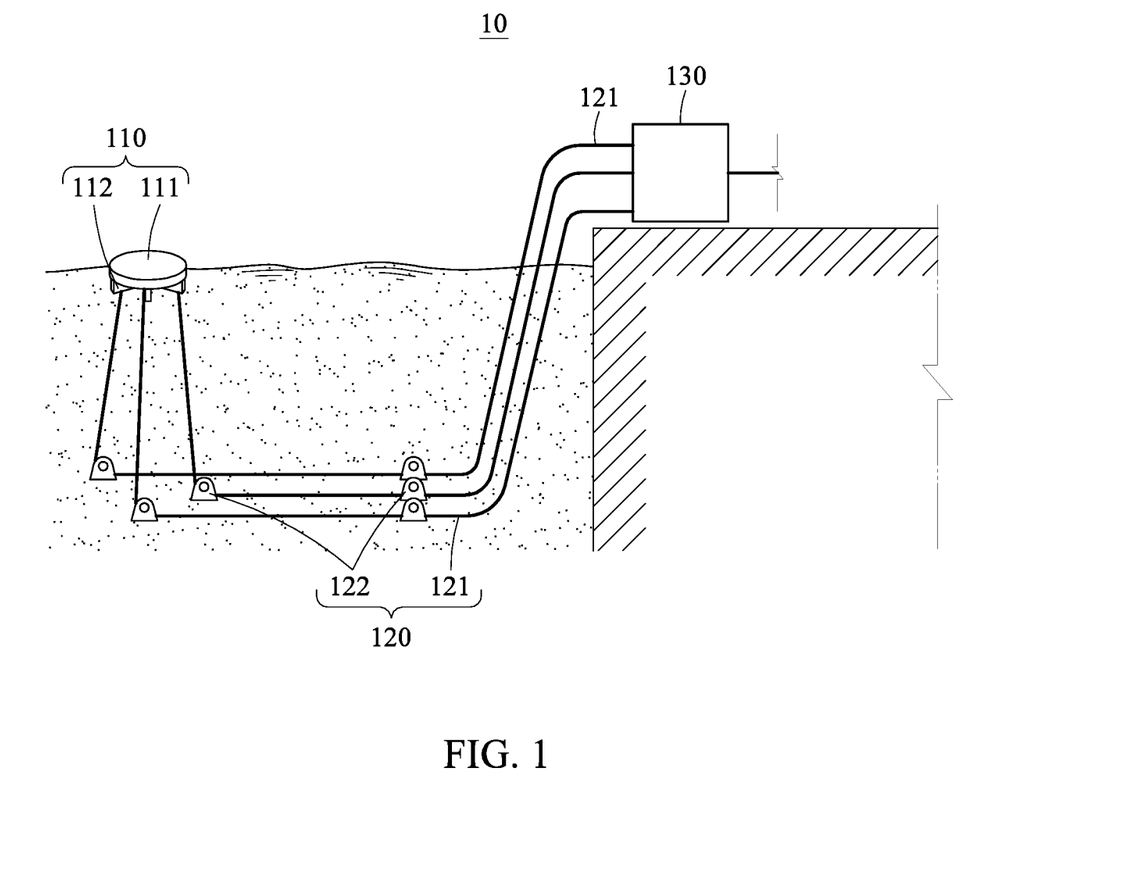
FIG. 1 is a diagram illustrating a concept of a wave power generation system according to an example embodiment.
Figure 2:
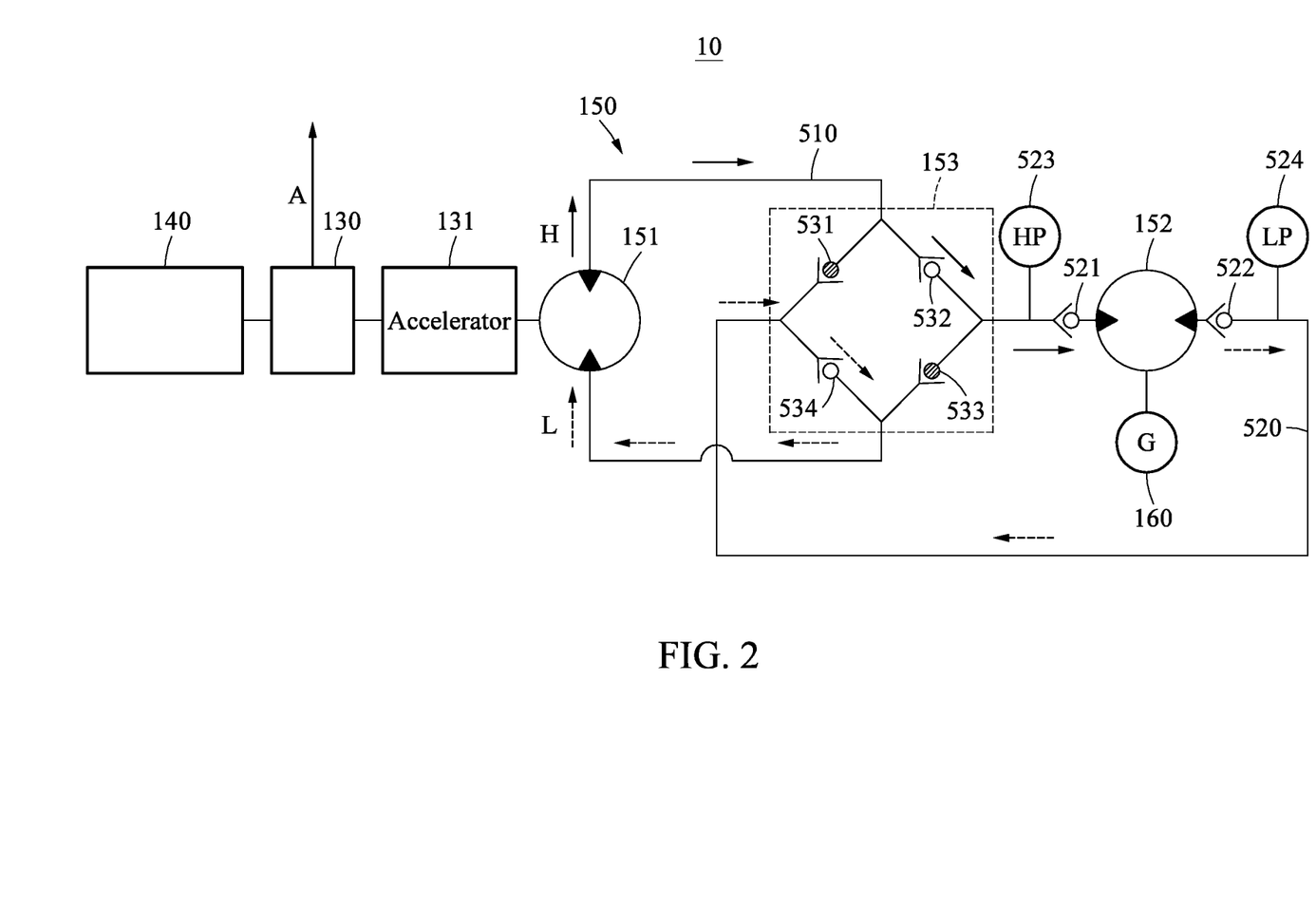
FIGS. 2 and 3 are block diagrams illustrating a configuration and an operation of the wave power generation system of FIG. 1.
Figure 3:
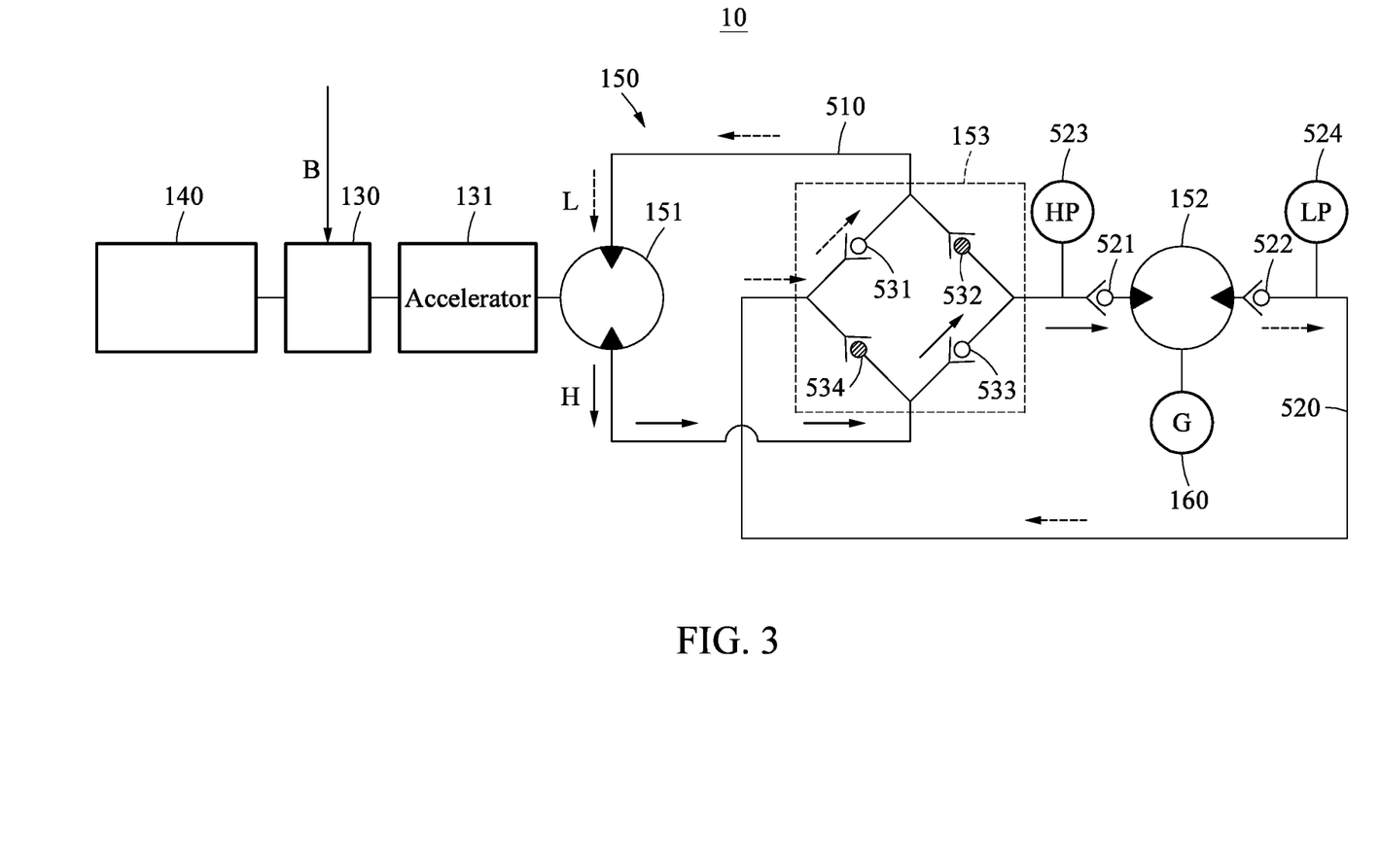

Hereinafter, a wave power generation system 10 according to example embodiments will be described with reference to FIGS. 1 through 3. FIG. 1 schematically illustrates the wave power generation system 10 according to an example embodiment, and FIGS. 2 and 3 are block diagrams illustrating a configuration and an operation of the wave power generation system 10 of FIG. 1.

Referring to the drawings, the wave power generation system 10 may be configured to include a movable object 110, a motion transmission unit 120, a converting body 130, an equalizer 140, and a power generation unit 160.

The movable object 110 may move in six degrees-of-freedom based on movement of waves while floating on the waves. Specifically, the movable object 110 may perform a total of six degrees-of-freedom motions by performing translational motions such as heave, surge, and sway, or rotational motions such as yaw, pitch, and roll, along an x-axis, a y-axis and a z-axis based on movement of waves.

For example, the movable object 110 may be formed to move based on movement of waves while floating on waves, and may be a float or a buoy. The movable object 110 may be configured to include a body 111 formed to float on waves, and a coupling portion 112 to which the motion transmission unit 120 is coupled.

The body 111 of the movable object 110 may be formed with various shapes. The body 111 may be, for example, disc-shaped or tubular shaped, and may have various shapes, for example, a cylinder, a polygonal column, a dome shape, or a disc shape. The body 111 may have various shapes by each form, shape, material, function, characteristic, effect, and a coupling relationship, and may be configured with various shapes. Also, a material of the body 111 may include all materials capable of floating on waves, but is not particularly limited thereto.

The coupling portion 112 may be formed to couple the body 111 to the motion transmission unit 120, and may have, for example, a shape of a ball joint with a motion angle of 360 degrees. The coupling portion 112 may be coupled so that the movable object 110 may freely move within a predetermined range in multiple directions based on movement of waves, and may be coupled to at least three different portions of the body 111 to transmit a six-degrees-of-freedom motion of the movable object 110. However, this is merely an example, and the coupling portion 112 may be coupled in various schemes that allow the motion transmission unit 120 to be coupled to the movable object 110 so that the movable object 110 may freely move within a limited range. Also, a position of the coupling portion 112 is not limited by the drawings, and may change to a position that may allow the movable object 110 to freely move within a predetermined range while preventing the movable object 110 from deviating from the predetermined range among various positions of the body 111.

Also, the coupling portion 112 may have a shape of a partition vertically formed under the body 111. The coupling portion 112 may be formed perpendicular to a horizontal plane so that the movable object 110 may more actively move in conjunction with movement of waves, and accordingly the movable object 110 may more efficiently move by movement of waves when a wave force is vertically exerted on the coupling portion 112. However, this is merely an example, and the coupling portion 112 may be configured so that the movable object 110 may receive forces of waves in all directions and that energy or movement of waves may be efficiently transmitted to movement of the movable object 110.

The motion transmission unit 120 may include a tension transmission member 121 that is coupled to the movable object 110 and configured to transmit movement of the movable object 110, and a fixing member 122 that is configured to fix the tension transmission member 121 to the sea floor, and the like.

The tension transmission member 121 may convert multi-directional movement of the movable object 110 by waves into a linear reciprocating motion, and may apply tension to the converting body 130.

For example, the tension transmission member 121 may have a shape of a predetermined wire, and may have one end coupled to the movable object 110 and another end connected to the converting body 130. Also, the tension transmission member 121 may be a rope, a chain, a sprocket, a belt, and the like, in addition to a wire. In addition, the tension transmission member 121 may include, for example, a variety of means capable of connecting the movable object 110 and the converting body 130 and transmitting kinetic energy of the movable object 110.

The tension transmission member 121 may react to all movements of the movable object 110 in conjunction with the six degrees-of-freedom motion of the movable object 110, and thus the tension transmission member 121 may efficiently transmit a multi-direction motion of the movable object 110 to the power conversion unit 150. Also, tension transmission members 121 may be connected to at least three portions of the movable object 110, and may function to efficiently transmit all kinetic energy of the movable object 110 by allowing the movable object 110 to freely move within a predetermined range while preventing the movable object 110 from deviating from the predetermined range.

Specifically, when a force is applied to the movable object 110 in one direction while the movable object 110 is floating on a surface of the sea by a multi-directional force by waves, one tension transmission member 121 corresponding to a portion of the movable object 110 to which the force is applied may be pulled and a tension may be transmitted to the converting body 130 by the one tension transmission member 121. When a force is applied to the movable object 110 in another direction, another tension transmission member 121 corresponding to a portion of the movable object 110 to which the force is applied may be pulled and a tension may be transmitted to the converting body 130 by a tension exerted on the other tension transmission member 121. Also, the movable object 110 may move in multiple directions in response to forces of waves continuing to be exerted on the movable object 110 in multiple directions, and a plurality of tension transmission members 121 connected to a plurality of portions of the movable object 110 may perform reciprocating linear motions. In addition, when a tension is applied to the converting body 130 by the reciprocating linear motions of the plurality of tension transmission members 121, kinetic energy of the movable object 110 may be transmitted in a form of a tension to the converting body 130.

The fixing member 122 may be installed in the sea floor or other places, and may function to fix the tension transmission member 121 and to change a direction of the tension transmission member 121. In other words, the tension transmission member 121 may move about the fixing member 122 as a central axis within a predetermined range. Also, the fixing member 122 may be disposed in at least one position or a plurality of positions in a longitudinal direction of one tension transmission member 121. Further, the fixing member 122 may be disposed in a position for changing the direction of the tension transmission member 121, to change the direction of the tension transmission member 121, to change a force transmission direction. For example, the fixing member 122 may include a plurality of rollers or a pulley.

The converting body 130 may be connected to a plurality of tension transmission members 121, and may have a shape of a rotating shaft or a drum that converts a reciprocating linear motion of the tension transmission member 121 into a unidirectional rotational motion. Also, the converting body 130 may include a one-way clutch to convert the reciprocating linear motion of the tension transmission member 121 into a unidirectional rotational motion. However, this is merely an example, and a variety of means capable of converting movement of the tension transmission member 121 into a reciprocating rotational motion or a reciprocating rectilinear motion may be substantially used as the converting body 130.

One side of the converting body 130 may be connected to the equalizer 140, and another side of the converting body 130 may be connected to the power conversion unit 150 and the power generation unit 160. An accelerator 131 may be disposed between the converting body 130 and the power conversion unit 150, to increase a rotational speed of the converting body 130 from a low speed to a high speed. The accelerator 131 may be formed at a low gear ratio to increase the rotational speed of the converting body 130 from a low speed to a predetermined high speed.

Here, another accelerator (although not shown in the drawings) may also be disposed between the converting body 130 and the equalizer 140.

Since the tension transmission member 121 has a shape of a wire, it may be impossible to apply a tension to the converting body 130 by the tension transmission member 121 when the tension transmission member 121 is not pulled by the movable object 110. In other words, when the tension transmission member 121 moves in one direction in response to movement of the movable object 110, the tension transmission member 121 may be pulled to apply a tension to the converting body 130. When the tension transmission member 121 moves in an opposite direction, the tension transmission member 121 may be loosened so that a force may not be applied to the converting body 130. In the present example embodiment, when the tension is not applied by the tension transmission member 121, a tension of the converting body 130 may be maintained by the equalizer 140 so that power may be generated in the power generation unit 160.

The equalizer 140 may be provided on one side of the converting body 130. For example, the equalizer 140 may be one of a hydraulic motor, a hydraulic pump, a hydraulic cylinder, an electric motor, a gas spring, a mechanical spring, and a flywheel.

Specifically, the equalizer 140 may store a tension applied by the tension transmission member 121 as predetermined energy. When a tension is not applied by the tension transmission member 121, energy stored in the equalizer 140 may be used to maintain the tension of the tension transmission member 121 through the converting body 130. For example, when the equalizer 140 is a hydraulic motor, a hydraulic pump, or a hydraulic cylinder, the tension may be stored in a form of a fluid pressure. When the equalizer 140 is an electric motor, the tension may be stored as rotational energy of a motor. When the equalizer 140 is a gas spring or a mechanical spring, the tension may be stored in a form of elastic energy. When the equalizer 140 is a flywheel, the tension may be stored as inertial energy. However, this is merely an example, and the type of the equalizer 140 may be substantially variously changed.

The power conversion unit 150 may include a fluid pressure generation unit 151 configured to generate a fluid pressure, a hydraulic driving unit 152 connected to the power generation unit 160, and a rectifier circuit 530 configured to change a direction of a fluid. Also, the power conversion unit 150 may include a first hydraulic circuit 510 configured to allow a fluid to flow toward the fluid pressure generation unit 151, and a second hydraulic circuit 520 configured to allow a fluid to flow toward the hydraulic driving unit 152.

The fluid pressure generation unit 151 may generate a fluid pressure by a tension applied by the tension transmission member 121. The fluid pressure generation unit 151 may be, for example, a hydraulic motor.

When a tension is applied by the tension transmission member 121 (as indicated by an arrow A of FIG. 2), the fluid pressure generation unit 151 may allow a fluid to flow in a first direction. When tension is applied by the equalizer 140 (as indicated by an arrow B of FIG. 3), the fluid pressure generation unit 151 may allow a fluid to flow in a second direction opposite to the first direction.

The hydraulic driving unit 152 may be connected to the power generation unit 160. When a fluid flows along the second hydraulic circuit 520, the hydraulic driving unit 152 may operate the power generation unit 160.

In the second hydraulic circuit 520, a fluid may flow in one direction only, and a plurality of check valves 521 and 522 may be provided. For example, in the second hydraulic circuit 520, the check valves 521 and 522 may be provided in front of and behind the hydraulic driving unit 152.

Also, in the second hydraulic circuit 520, a high-pressure accumulator 523 and a low-pressure accumulator 524 may be provided in front of and behind the hydraulic driving unit 152. Since the high-pressure accumulator 523 and the low-pressure accumulator 524 are provided, energy may be stored in the form of pressure and volume of a fluid in the high-pressure accumulator 523 when the fluid flows in the second hydraulic circuit 520, and the hydraulic driving unit 152 may be operated when the stored energy moves to the low-pressure accumulator 524, thereby obtaining a smoothing effect. Thus, power generated in the power generation unit 160 may have a constant quality and a performance of the power generation unit 160 may be optimized.

The rectifier circuit 530 may be provided in a form of a bridge to change a flow direction of a fluid between the first hydraulic circuit 510 and the second hydraulic circuit 520. The rectifier circuit 530 may function as a one-way clutch to allow a fluid to flow in one direction in the second hydraulic circuit 520 even though the fluid flows in the first direction and the second direction in the first hydraulic circuit 510.

The rectifier circuit 530 may be formed in a rectangular shape with two branch flow paths connected to the first hydraulic circuit 510 and two branch flow paths connected to the second hydraulic circuit 520, and check valves 531, 532, 533, and 534 may be provided in the branch flow paths, respectively. Also, in the rectifier circuit 530, the check valves 531, 532, 533, and 534 on branch flow paths facing each other may be disposed in the same direction, and the check valves 531, 532, 533, and 534 on neighboring branch flow paths may be disposed in different directions. By arranging the check valves 531, 532, 533, and 534 in the rectifier circuit 530 as described above, the flow direction of the fluid may be changed as shown in FIGS. 2 and 3.

The power generation unit 160 may be driven by the hydraulic driving unit 152 to generate power.

In the present example embodiment, a plurality of tension transmission members 121 may be connected to one movable object 110, and one equalizer 140, one power conversion unit 150 and one power generation unit 160 may be connected to the plurality of tension transmission members 121. However, this is merely an example, and it may be possible to individually install an equalizer 140, a power conversion unit 150 and a power generation unit 160 in each of the plurality of tension transmission members 121.

Also, in the above-described example embodiments, the wave power generation system 10 is illustrated as being installed onshore, however, this is merely an example. The wave power generation system 10 according to example embodiments may also be applicable to a system installed offshore.

Hereinafter, a configuration and an operation of the wave power generation system 10 according to example embodiments will be described in detail with reference to FIGS. 2 and 3.

Referring to FIG. 2, when a tension of the tension transmission member 121 is applied and when the converting body 130 is pulled (as indicated by the arrow A), predetermined energy may be stored in the equalizer 140 connected to one side of the converting body 130, and a fluid may be allowed to flow in the first direction in the power conversion unit 150.

Specifically, when the tension transmission member 121 is pulled, unidirectional rotation of the converting body 130 may be accelerated to a predetermined speed or higher through the accelerator 131 and may be transmitted to the fluid pressure generation unit 151.

A fluid on a high-pressure side of the fluid pressure generation unit 151 may flow in the first direction along an arrow H in the first hydraulic circuit 510, toward the second hydraulic circuit 520 through the second check valve 532 of the rectifier circuit 530.

The fluid may flow toward the low-pressure accumulator 524 through the high-pressure accumulator 523 in the second hydraulic circuit 520, and accordingly power may be generated in the power generation unit 160 by the hydraulic driving unit 152.

The fluid may flow toward a low-pressure side of the fluid pressure generation unit 151 along an arrow L through the fourth check valve 534 of the rectifier circuit 530 in the first hydraulic circuit 510.

Here, when the fluid flows in the first direction, a flow of the fluid through the first and third check valves 531 and 533 of the rectifier circuit 530 may be blocked.

Next, referring to FIG. 3, when the tension of the tension transmission member 121 is not applied, the converting body 130 may be pulled in an opposite direction by the energy stored in the equalizer 140 (as indicated by the arrow B).

Here, the power conversion unit 150 may allow a fluid to flow in the second direction opposite to the first direction.

Specifically, when a force is applied to the converting body 130 by the equalizer 140 in a direction indicated by the arrow B, rotation of the converting body 130 may be accelerated to a predetermined speed or higher through the accelerator 131 and may be transmitted to the fluid pressure generation unit 151.

Here, a high-pressure side of the fluid pressure generation unit 151 may be opposite to that of FIG. 2, and accordingly the fluid may flow in the second direction along an arrow H in the first hydraulic circuit 510. Also, the fluid may flow to the second hydraulic circuit 520 through the third check valve 533 of the rectifier circuit 530.

In the second hydraulic circuit 520, the fluid may flow to the low-pressure accumulator 524 through the high-pressure accumulator 523, and accordingly power may be generated in the power generation unit 160 by the hydraulic driving unit 152.

Also, the fluid flowing in the low-pressure accumulator 524 may flow to a low-pressure side of the fluid pressure generation unit 151 along an arrow L through the first check valve 531 of the rectifier circuit 530 in the first hydraulic circuit 510.

Here, when the fluid flows in the second direction, a flow of the fluid through the second and fourth check valves 532 and 534 of the rectifier circuit 530 may be blocked.

Since the fluid pressure generation unit 151 and the hydraulic driving unit 152 are hydraulic motors in the present example embodiment, a driving source to drive the fluid pressure generation unit 151 and the hydraulic driving unit 152 may be omitted, thereby simplifying a size and configuration of the wave power generation system 10. Also, energy may be stored in the form of pressure and volume of a fluid in the high-pressure accumulator 523 and the low-pressure accumulator 534 and used to operate the hydraulic driving unit 152, thereby generating power with a smoothing effect. Thus, it is possible to manage a constant quality of power generated in the power generation unit 160 and to optimize an electric generator.

Also, power may be generated in the power generation unit 160 alternately by the tension of the tension transmission member 121 and the equalizer 140.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:
1. A wave power generation system comprising:
   a tension transmission member configured to transmit kinetic energy generated by a six-degrees-of-freedom motion of a movable object floating on waves;
   a power conversion unit; and an equalizer connected to the tension transmission member and configured to maintain a tension of the tension transmission member, wherein the power conversion unit comprises:
- a fluid pressure generation unit that is connected to the tension transmission member and that is configured to generate a fluid pressure;
- a hydraulic driving unit connected to a power generation unit to generate power;
- a first hydraulic circuit configured to allow a fluid to flow toward the fluid pressure generation unit;
- a second hydraulic circuit configured to allow a fluid to flow toward the hydraulic driving unit, the second hydraulic circuit comprising a high-pressure accumulator and a low-pressure accumulator provided in front of and behind the hydraulic driving unit; and
- a rectifier circuit disposed between the first hydraulic circuit and the second hydraulic circuit and configured to change a direction of the fluid, wherein when the tension is applied by the tension transmission member, the fluid pressure generation unit in the power conversion unit allows a fluid to flow in a first direction by the tension, and wherein when the tension is not applied by the tension transmission member, the fluid pressure generation unit allows a fluid to flow in a second direction by the equalizer.

2. The wave power generation system of claim 1, wherein the rectifier circuit comprises a plurality of branch flow paths arranged in a form of a bridge,
check valves are disposed on the plurality of branch flow paths, respectively,
check valves on branch flow paths facing each other in the rectifier circuit are disposed in the same direction, and
check valves on neighboring branch flow paths are disposed in different directions.

3. The wave power generation system of claim 1, wherein each of the fluid pressure generation unit and the hydraulic driving unit is a hydraulic motor.

4. The wave power generation system of claim 1, wherein the second hydraulic circuit comprises a plurality of check valves, and
the check valves are provided in front of and behind the hydraulic driving unit.

5. The wave power generation system of claim 1, wherein the equalizer comprises one of a hydraulic motor, a hydraulic pump, a hydraulic cylinder, an electric motor, a gas spring, and a mechanical spring.

6. The wave power generation system of claim 1, wherein a plurality of tension transmission members connected to at least three portions of the movable object are provided.

7. The wave power generation system of claim 6, wherein a converting body coupled to the plurality of tension transmission members is provided,
the power conversion unit is provided on one side of the converting body, and
the equalizer is provided on another side of the converting body.

8. The wave power generation system of claim 7, wherein an equalizer is provided in each of the plurality of tension transmission members, or
the plurality of tension transmission members are connected to one equalizer.

9. The wave power generation system of claim 7, wherein an accelerator configured to increase a rotational speed of the converting body is included, and the accelerator is disposed between the converting body and the power conversion unit.

10. A wave power generation system comprising:
a movable object that moves by waves while floating on the waves;
a motion transmission unit comprising a plurality of tension transmission members that connected to at least three portions of the movable object to enable a six degrees-of-freedom motion of the movable object and that are configured to transmit kinetic energy of the movable object in one direction;
a converting body connected to the plurality of tension transmission members;
an equalizer disposed on one side of the converting body;
a power conversion unit disposed on another side of the converting body and configured to generate a fluid pressure; and
a power generation unit connected to the power conversion unit and configured to generate power,
wherein the power conversion unit comprises:
- a fluid pressure generation unit connected to the tension transmission members and configured to generate a fluid pressure;
- a hydraulic driving unit connected to the power generation unit to generate power;
- a first hydraulic circuit configured to allow a fluid to flow toward the fluid pressure generation unit;
- a second hydraulic circuit configured to allow a fluid to flow toward the hydraulic driving unit, the second hydraulic circuit comprising a high-pressure accumulator and a low-pressure accumulator provided in front of and behind the hydraulic driving unit; and
- a rectifier circuit disposed between the first hydraulic circuit and the second hydraulic circuit and configured to change a direction of the fluid, wherein when the tension transmission members are pulled, energy is stored in the equalizer, and the power conversion unit allows a fluid to flow in a first direction so that power is generated in the power generation unit, and wherein when the tension transmission members are not pulled, the power conversion unit allows a fluid to flow in a second direction by the energy stored in the equalizer so that power is generated in the power generation unit.

11. The wave power generation system of claim 10, wherein the equalizer comprises one of a hydraulic motor, a hydraulic pump, a hydraulic cylinder, an electric motor, a gas spring, and a mechanical spring.

12. A method of controlling a wave power generation system, the method comprising:
allowing, by a power conversion unit, a fluid to flow in a first direction along a first hydraulic circuit when a tension is applied through a tension transmission member by a six degrees-of-freedom motion of a movable object floating on waves;
storing energy in an equalizer;
allowing, by a rectifier circuit of the power conversion unit, the fluid flowing in the first direction to flow toward a hydraulic driving unit along a second hydraulic circuit;
generating, by a power generation unit connected to the hydraulic driving unit, power when a fluid flows from a high-pressure accumulator of the second hydraulic circuit to a lower-pressure accumulator of the second hydraulic circuit;

allowing, by the power conversion unit, a fluid to flow in a second direction along the first hydraulic circuit using the energy stored in the equalizer when the tension is not applied by the tension transmission member, the second direction being opposite to the first direction;

changing, by the rectifier circuit, a direction of the fluid flowing in the second direction and allowing the fluid to flow toward the hydraulic driving unit in a same direction as the first direction along the second hydraulic circuit; and generating, by the power generation unit, power when a fluid flows from the high-pressure accumulator to a lower-pressure accumulator.

\* \* \* \* \*